(12) United States Patent
Carnahan

(10) Patent No.: US 12,726,753 B2
(45) Date of Patent: Sep. 1, 2026

(54) EQUINE AUDIO SYSTEM WITH OPTIMIZED SIGNAL PROCESSING

(71) Applicant: Natalie James Carnahan, Pasadena, CA (US)

(72) Inventor: Natalie James Carnahan, Pasadena, CA (US)

( * ) Notice: Subject to any disclaimer, the term of this patent is extended or adjusted under 35 U.S.C. 154(b) by 122 days.

(21) Appl. No.: 18/909,884

(22) Filed: Oct. 8, 2024

(65) Prior Publication Data

US 2026/0101133 A1 Apr. 9, 2026

(51) Int. Cl.

| | |
|---|---|
| ***H04R 1/10*** | (2026.01) |
| ***A01K 15/00*** | (2006.01) |
| ***G06F 3/01*** | (2006.01) |
| ***G06F 3/16*** | (2006.01) |
| ***H04R 1/34*** | (2006.01) |
| ***H04R 3/04*** | (2006.01) |

(52) U.S. Cl.

CPC ........... *H04R 1/1041* (2013.01); *A01K 15/00* (2013.01); *G06F 3/012* (2013.01); *G06F 3/165* (2013.01); *H04R 1/1016* (2013.01); *H04R 1/1083* (2013.01); *H04R 1/345* (2013.01); *H04R 3/04* (2013.01); *H04R 2420/07* (2013.01); *H04R 2460/01* (2013.01)

(58) Field of Classification Search

CPC .. H04R 1/1016; H04R 1/1041; H04R 1/1083; A01K 15/00; G06F 3/012; G06F 3/165

See application file for complete search history.

(56) References Cited

U.S. PATENT DOCUMENTS 6,591,786 B1 * 7/2003 Davis ..................... A01K 11/00 119/905
7,506,720 B1 * 3/2009 Hicks ...................... A61F 11/08 381/313
11,122,356 B1 * 9/2021 Braun .................. H04R 5/0335
11,419,766 B2 * 8/2022 Hansen ................... A61F 11/08
11,763,642 B2 * 9/2023 Lewis ...................... G08B 3/00 340/539.11
12,302,860 B2 * 5/2025 McCreery ............... A61F 11/14

(Continued)

FOREIGN PATENT DOCUMENTS

WO WO-2015079126 A1 * 6/2015 ............... B68B 7/00
WO WO-2018137037 A1 * 8/2018 ........... A01K 15/021

OTHER PUBLICATIONS

English Language Translation of WO 2015/079126 A1, pp. 1-8 (Year: 2015).*

*Primary Examiner* — Paul W Huber
(74) *Attorney, Agent, or Firm* — Sam Pierce

(57) ABSTRACT

An equine audio system for modulating sound input to a horse comprises anatomically-shaped earbuds with speakers configured to fit securely in the horse's ears. A digital audio processor receives an input audio signal, applies signal processing to generate an output audio signal optimized for an equine auditory system, and transmits the output audio signal to the speakers. The signal processing includes noise cancellation, frequency equalization to emphasize frequencies within the equine hearing range, and dynamic range compression. The earbuds attenuate ambient noise and may include acoustically optimized sound tubes. The system may further include a wireless receiver, a remote control device, an accelerometer for motion-based audio adjustment, and sudden loud noise detection and gradual attenuation capabilities.

16 Claims, 4 Drawing Sheets

(56) References Cited

U.S. PATENT DOCUMENTS

| | | | | |
|---|---|---|---|---|
| 2002/0152970 | A1* | 10/2002 | Takeda | A01K 15/02 119/719 |
| 2009/0071414 | A1* | 3/2009 | Caputo | A01K 15/021 119/719 |
| 2010/0263603 | A1* | 10/2010 | Baron | A01K 13/006 136/244 |
| 2014/0247951 | A1* | 9/2014 | Malaviya | H04R 1/105 381/74 |

* cited by examiner

EQUINE AUDIO SYSTEM WITH OPTIMIZED SIGNAL PROCESSING

BACKGROUND OF THE INVENTION

Field of Invention

The present disclosure relates to the field of equine audio systems and methods for modulating sound input to horses.

Description of Prior Art

Horses are exposed to various environmental noises during transport, racing, training, and other circumstances. Such noises can startle horses, potentially leading to dangerous reactions and even fatal injuries, which is a significant concern given the substantial financial value often associated with horses. Existing solutions for reducing noise exposure in horses, such as conventional earplugs, suffer from several deficiencies. While earplugs can attenuate noise levels, they block out all sound indiscriminately and do not allow for the playback of music or calming audio to the horse.

Accordingly, there is a need in the art for an improved equine audio system capable of both attenuating undesirable environmental noise and delivering calming audio tailored for a horse's auditory system. Such a system would greatly improve the safety and welfare of horses in various situations where they are exposed to potentially startling noises.

BRIEF SUMMARY OF THE INVENTION

This summary is provided to introduce a selection of concepts, in a simplified format, that are further described in the detailed description of the invention. This summary is neither intended to identify key or essential inventive concepts of the invention nor is it intended for determining the scope of the invention.

The present disclosure provides an equine audio system and method for modulating sound input to horses. In one aspect, the equine audio system includes a pair of anatomically-shaped earbuds configured to fit securely in a horse's ears, each earbud comprising a speaker for generating sound. A digital audio processor is electrically coupled to the speakers and configured to receive an input audio signal from an audio source, apply signal processing to generate an output audio signal optimized for an equine auditory system, and transmit the output audio signal to the speakers. The signal processing may include noise cancellation, frequency equalization, and dynamic range compression. The system further includes a wireless receiver for receiving the input audio signal from a remote audio source.

In various embodiments, the signal processing may further include generating the output audio signal to include a music track specially designed to relieve stress in horses. The anatomically-shaped earbuds may attenuate ambient noise by at least 20 dB when fitted securely in the horse's ears. The frequency equalization may boost frequencies between 1 kHz and 4 kHz, corresponding to the most sensitive range of equine hearing. The digital audio processor may apply a low-pass filter to attenuate frequencies above 10 KHz before generating the output audio signal.

The equine audio system may further include a remote control device wirelessly coupled to the digital audio processor, allowing a user to adjust the signal processing. The digital audio processor may analyze the input audio signal to detect sudden loud noises exceeding a predefined volume threshold and gradually attenuate the output audio signal over a time span of at least 1 second to avoid startling the horse. An accelerometer may be coupled to the digital audio processor to provide motion data indicative of the horse's head movement, allowing the digital audio processor to adjust the signal processing to compensate for changes in the earbud position within the horse's ears.

In another aspect, a method for modulating sound input to a horse includes receiving an input audio signal, processing the input audio signal using a digital audio processor to generate an output audio signal optimized for an equine auditory system, transmitting the output audio signal to a pair of anatomically-shaped earbuds configured to fit securely in the horse's ears, and generating sound using speakers in the earbuds based on the output audio signal. The method may further include generating the output audio signal to include a music track specially designed to relieve stress in horses, attenuating ambient noise by at least 20 dB using the anatomically-shaped earbuds, and boosting frequencies between 1 kHz and 4 kHz during frequency equalization.

Additional features and advantages of the invention will be set forth in the description which follows, and in part will be obvious from the description, or may be learned by the practice of the invention. These and other features of the present invention will become more fully apparent from the following description, or may be learned by the practice of the invention as set forth hereinafter.

BRIEF DESCRIPTION OF THE DRAWINGS

The various exemplary embodiments of the present invention, which will become more apparent as the description proceeds, are described in the following detailed description in conjunction with the accompanying drawings, in which.

DETAILED DESCRIPTION

Figure 1:
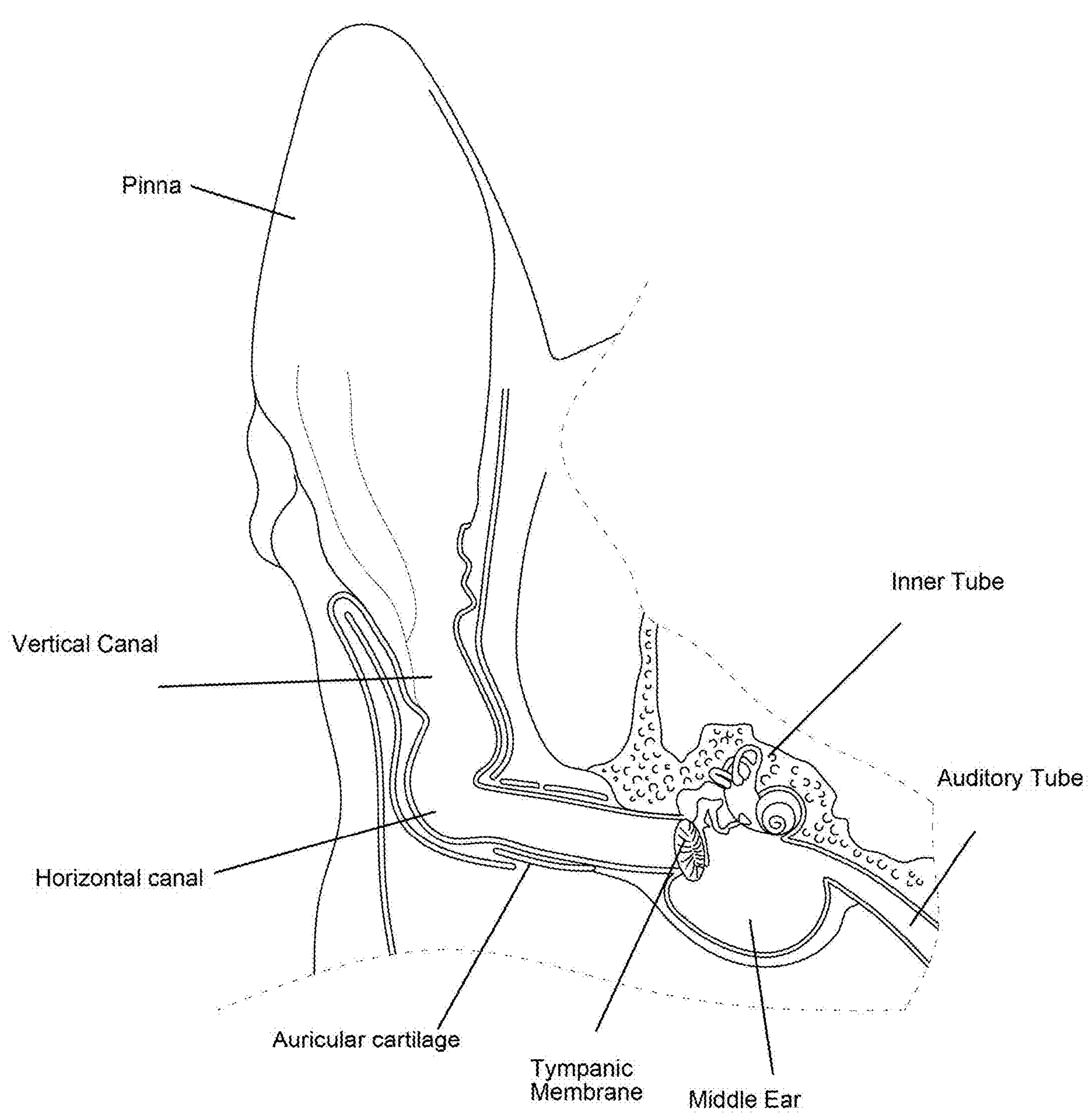
FIG. 1 is a cross-sectional view illustrating a horse's ear.

In the following detailed description of the preferred embodiments, reference is made to the accompanying drawings, which form a part hereof and show, by way of illustration, specific embodiments in which the invention may be practiced. It is to be understood that other embodiments may be used and structural or logical changes may be made without departing from the scope of the present invention. The following detailed description, therefore, is not to be taken in a limiting sense, and the scope of the present invention is defined by the appended claims.

The following description is provided as an enabling teaching of the present systems, and/or methods in its best, currently known aspect. To this end, those skilled in the relevant art will recognize and appreciate that many changes can be made to the various aspects of the present systems described herein, while still obtaining the beneficial results of the present disclosure. It will also be apparent that some of the desired benefits of the present disclosure can be obtained by selecting some of the features of the present disclosure without utilizing other features.

Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

The terms "a" and "an" and "the" and similar references used in the context of describing a particular embodiment of the present invention (especially in the context of certain claims) are construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein.

All systems described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. No language in the specification should be construed as indicating any non-claimed element essential to the practice of the application. Thus, for example, reference to "an element" can include two or more such elements unless the context indicates otherwise.

As used herein, the terms "optional" or "optionally" mean that the subsequently described event or circumstance can or cannot occur, and that the description includes instances where said event or circumstance occurs and instances where it does not.

The word or as used herein means any one member of a particular list and also includes any combination of members of that list. Further, one should note that conditional language, such as, among others, "can," "could," "might", or "may" unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Figure 2:
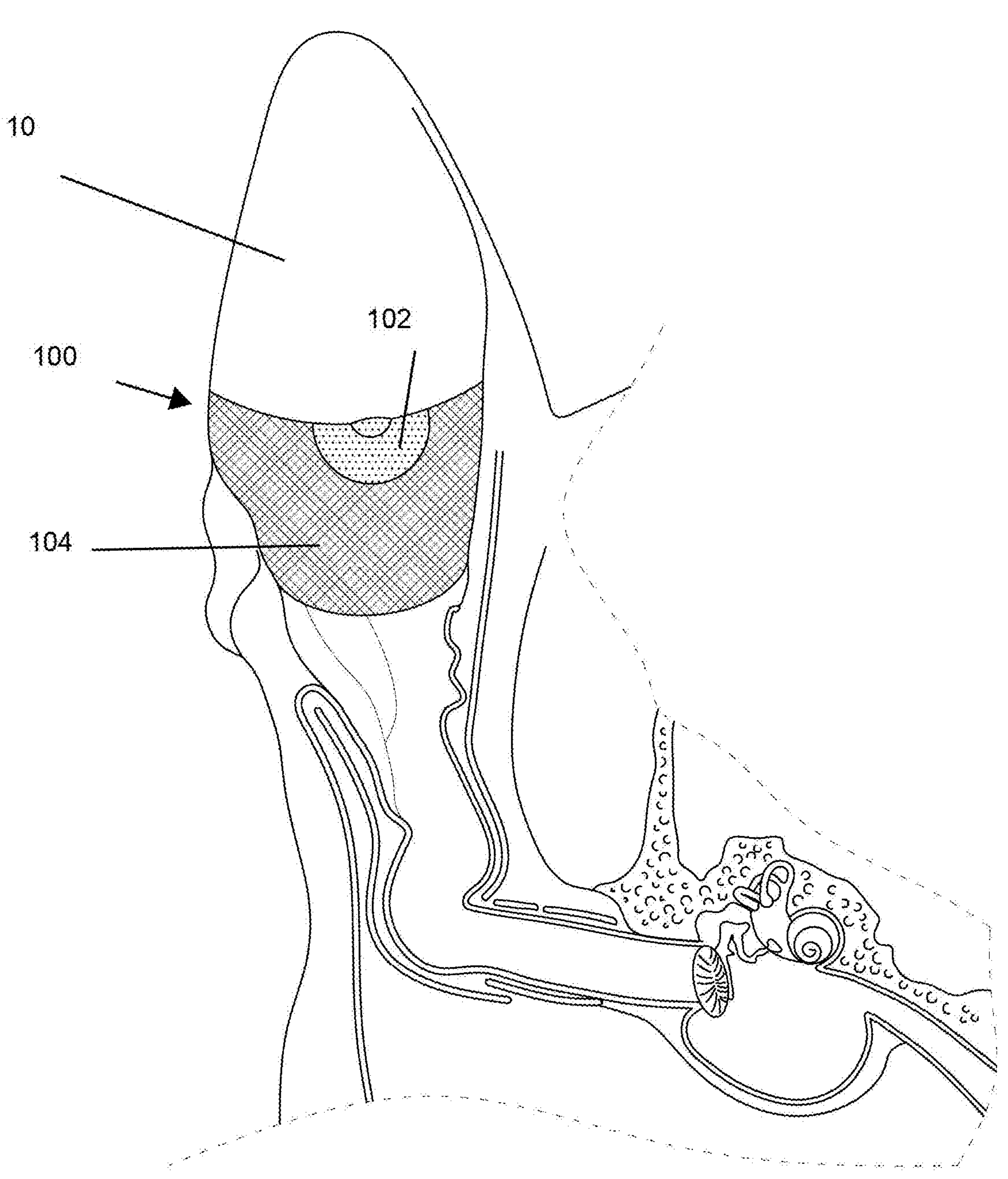
FIG. 2 is a cross-sectional view illustrating an embodiment of an anatomically-shaped earbud positioned securely within a horse's ear.
Figure 3:
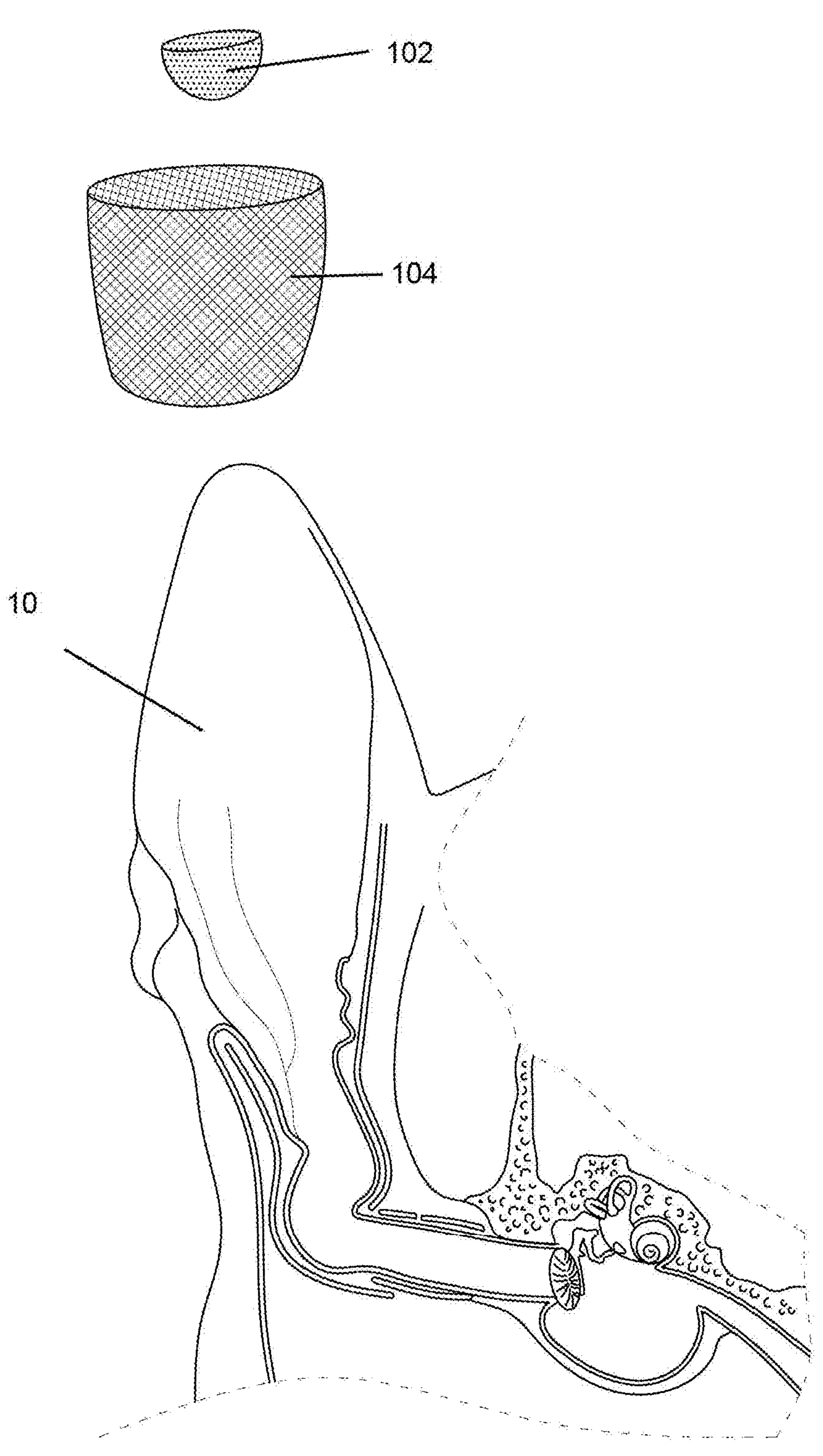
FIG. 3 illustrates the components of the ear bud.
Figure 4:
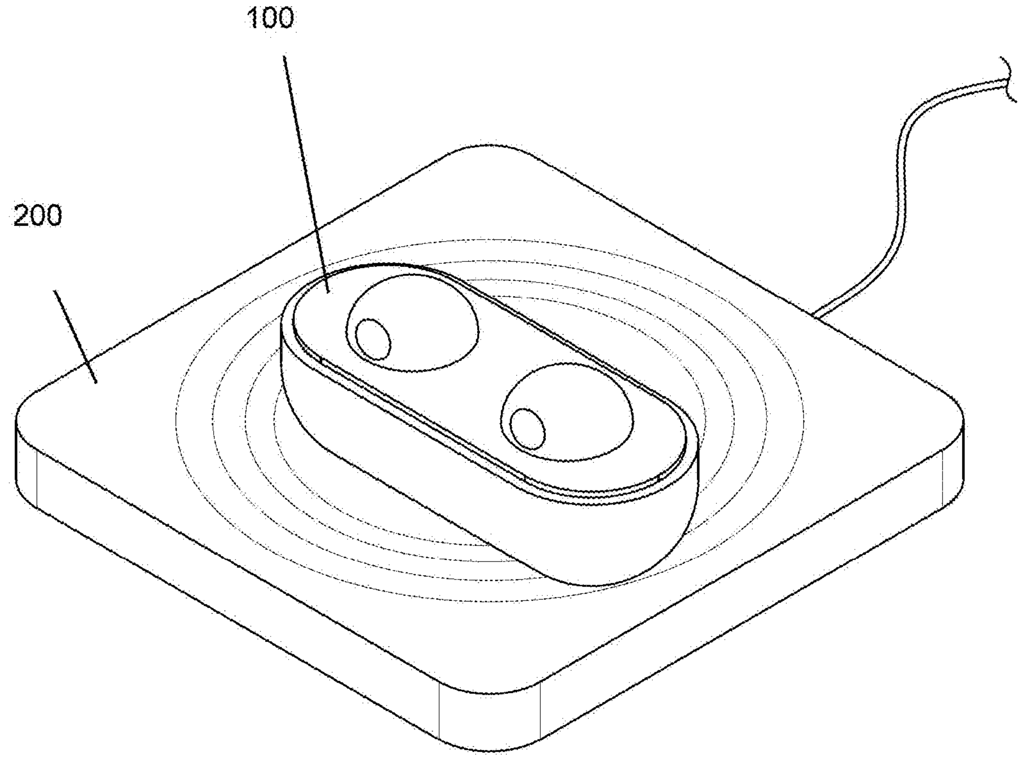
FIG. 4 illustrates charging the ear bud.

In FIG. 1-4, the following reference numerals are illustrated:

10—Horse Ear
100—equine audio system
102—earbuds/earphones
104—memory foam
200—wireless charging In FIG. 2, there is illustrated a cross-sectional view of an anatomically-shaped earbud positioned securely within a horse's ear. The earbud is part of an equine audio system configured to modulate sound input to a horse for enhancing the auditory experience and providing stress relief.

In the illustrated embodiment, the earbud comprises a main body ergonomically contoured to fit comfortably and securely within the complex geometry of the horse's ear. The main body is fabricated from a soft, flexible material such as, but not limited to, silicone or a thermoplastic elastomer to minimize irritation and maintain long-term wearability for the horse.

A speaker is housed within the main body of the earbud for generating sound waves. The speaker is positioned to direct sound waves into a horse's ear canal when the earbud is properly fitted. The anatomical shaping of the main body and precise positioning of the speaker enables the earbud to attenuate ambient noise by at least about 20 dB, thereby providing passive noise reduction for the horse.

Extending from the speaker is a sound tube that protrudes from the main body of the earbud. The sound tube acts as an acoustic waveguide to efficiently transmit sound waves generated by the speaker into the horse's ear canal. The length L and diameter D of the sound tube are optimized based on the acoustic properties of the equine ear canal to maximize sound quality and minimize distortion. In one embodiment, the sound tube has a length L between about 10 mm and about 30 mm and a diameter D between about 2 mm and about 8 mm.

In the illustrated embodiment, the sound tube is angled relative to the main body of the earbud to follow the natural curvature of the horse's ear canal. This angular orientation, defined by angle θ, ensures that the sound tube does not impinge upon the ear canal walls and cause discomfort to the horse. The angle θ is selected based on the average anatomical geometry of the equine ear.

At the distal end of the sound tube, a flexible tip further aids in the secure and comfortable retention of the earbud within the horse's ear. The flexible tip is composed of a soft, pliant material that conforms to the unique shape of each horse's ear canal. This customized fit provided by the flexible tip helps to maintain the earbud's position during equine movement and activity.

Electrical wires extend from the speaker through the main body of the earbud to interface with the digital audio processor. These electrical wires carry an output audio signal from the digital audio processor to drive the speaker. The electrical wires are carefully routed within the earbud to avoid any interference with the acoustic performance of the sound tube and to minimize the overall size and weight of the earbud.

In an exemplary embodiment, the equine audio system is configured to modulate sound input to a horse in order to optimize the auditory experience for the equine auditory system and provide stress relief.

The equine audio system comprises the pair of anatomically-shaped earbuds configured to fit securely in the horse's ears. In one embodiment, each earbud includes a speaker for generating sound. The anatomical shaping of the earbuds allows them to attenuate ambient noise by at least 20 dB when properly fitted in the horse's ears, thereby providing a degree of passive noise reduction.

In the illustrated embodiment, the digital audio processor is electrically coupled to the speakers in the earbuds. The digital audio processor is configured to receive an input audio signal from an audio source, apply signal processing to the input audio signal to generate an output audio signal optimized for the equine auditory system, and transmit the output audio signal to the speakers.

In one embodiment, the signal processing applied by the digital audio processor includes at least one of noise cancellation, frequency equalization, and dynamic range compression. The noise cancellation reduces environmental noise in the input audio signal. The dynamic range compression narrows the dynamic range of the input audio signal to make it more suitable for the equine auditory system. Additionally, the digital audio processor may apply a low-pass filter to attenuate frequencies above 10 KHz in the input audio signal before generating the output audio signal.

In another embodiment, the digital audio processor is further configured to analyze the input audio signal to detect sudden loud noises exceeding a predefined volume threshold. Upon detecting such a noise, the digital audio processor gradually attenuates the output audio signal over a time span of at least 1 second, thereby helping avoid startling the horse with an abrupt change in volume.

An accelerometer is coupled to the digital audio processor to provide motion data indicative of the horse's head movement. The digital audio processor adjusts the signal processing applied to the input audio signal based on this motion data in order to compensate for any changes in the positioning of the earbuds within the horse's ears as the horse moves.

In the illustrated embodiment, the equine audio system includes a wireless receiver, such as a Bluetooth receiver, for wirelessly receiving the input audio signal from a remote audio source, thereby allowing the audio source, such as a smartphone or media player, to transmit audio content to the equine audio system without a wired connection.

A remote control device is wirelessly coupled to the digital audio processor, enabling user control and customization of the equine audio system. In one embodiment, the remote control device is implemented as a smartphone, tablet, or other portable computing device running a dedicated application software, thereby providing a user-friendly interface for adjusting the signal processing parameters applied by the digital audio processor and allowing the user to fine-tune the audio experience for each individual horse.

In the illustrated embodiment, the smartphone or computing device acting as the remote control device communicates with the equine audio system via a wireless communication protocol, such as Bluetooth, Wi-Fi, or a proprietary radio frequency (RF) protocol, thereby allowing the user to control the system remotely, without the need for physical access to the horse or the audio equipment.

In addition to providing control functionality, the smartphone or computing device can also serve as an audio source for the equine audio system. The device's built-in music library or streaming capabilities allow the user to play custom audio content, such as specifically designed equine music tracks, nature sounds, or other audio recordings known to have calming effects on horses, for example. The audio content is wirelessly transmitted from the smartphone or computing device to the wireless receiver of the equine audio system for processing and playback through the earbuds.

In one embodiment, the digital audio processor is configured to generate the output audio signal to include specially designed music tracks for relieving stress in horses, wherein these tracks may include sounds and frequencies known to have a calming effect on the equine nervous system.

To optimize the transmission of sound from the speakers into the horse's ear canals, each earbud includes a sound tube extending from the speaker. In the illustrated embodiment, the length and diameter of the sound tube are acoustically optimized for efficient transmission of sound waves into the unique geometry of the equine ear canal.

The earbuds can be pulled out from the memory foam to replace the foam or the earbuds, if needed to be changed.

In summary, the equine audio system provides a comprehensive solution for modulating audio input to horses, comprising anatomically-optimized earbuds, a digital audio processor with equine-specific signal processing, wireless connectivity, and user control. By carefully tailoring the audio to the equine auditory system, the illustrated embodiment promotes stress relief and an enhanced auditory experience for horses.

The embodiments described herein are given for the purpose of facilitating the understanding of the present invention and are not intended to limit the interpretation of the present invention. The respective elements and their arrangements, materials, conditions, shapes, sizes, or the like of the embodiment are not limited to the illustrated examples but may be appropriately changed. Further, the constituents described in the embodiment may be partially replaced or combined together.

What is claimed is:

1. An equine audio system comprising:

a. a pair of anatomically-shaped earbuds configured to fit securely in a horse's ears, each earbud comprising a speaker for generating sound;

b. a digital audio processor electrically coupled to the speakers and configured to:

i. receive an input audio signal from an audio source, ii. apply signal processing to the input audio signal to generate an output audio signal optimized for an equine auditory system, wherein the signal processing comprises at least one of noise cancellation, frequency equalization, and dynamic range compression, and iii. transmit the output audio signal to the speakers;

c. a wireless receiver for receiving the input audio signal from a remote audio source; and d. an accelerometer coupled to the digital audio processor, wherein the digital audio processor is configured to:

receive motion data from the accelerometer indicative of the horse's head movement; and adjust the signal processing applied to the input audio signal based on the motion data to compensate for changes in the earbud position within the horse's ears.

2. The equine audio system of claim 1, wherein the signal processing further comprises generating the output audio signal to include a music track specially designed to relieve stress in horses.

3. The equine audio system of claim 1, wherein the anatomically-shaped earbuds are configured to attenuate ambient noise by at least 20 dB when fitted securely in the horse's ears.

4. The equine audio system of claim 1, wherein the digital audio processor is further configured to apply a low-pass filter to the input audio signal to attenuate frequencies above 10 kHz before generating the output audio signal.

5. The equine audio system of claim 1, wherein the wireless receiver is a Bluetooth receiver configured to receive the input audio signal from a Bluetooth-enabled remote audio source.

6. The equine audio system of claim 1, further comprising a remote control device wirelessly coupled to the digital audio processor, the remote control device configured to allow a user to adjust the signal processing applied by the digital audio processor.

7. The equine audio system of claim 1, wherein the digital audio processor is further configured to:

a. analyze the input audio signal to detect sudden loud noises exceeding a predefined volume threshold; and b. in response to detecting a sudden loud noise, gradually attenuate the output audio signal over a time span of at least 1 second to avoid startling the horse.

8. The equine audio system of claim 1, wherein the earbuds further comprise a sound tube extending from the speaker, the sound tube having a length and diameter acoustically optimized for efficient transmission of sound into the equine ear canal.

9. A method for modulating sound input to a horse, the method comprising:

a. receiving an input audio signal from an audio source;

b. processing the input audio signal using a digital audio processor to generate an output audio signal optimized for an equine auditory system, wherein processing the input audio signal comprises:

i. applying noise cancellation to the input audio signal to reduce environmental noise, ii. applying frequency equalization to the input audio signal to emphasize frequencies within an equine hearing range, and iii. applying dynamic range compression to the input audio signal to narrow a dynamic range of the input audio signal;

c. transmitting the output audio signal to a pair of anatomically-shaped earbuds configured to fit securely in the horse's ears;

d. generating sound using speakers in the earbuds based on the output audio signal to modulate sound input to the horse, e. analyzing the input audio signal to detect sudden loud noises exceeding a predefined volume threshold; and f. in response to detecting a sudden loud noise, gradually attenuating the output audio signal over a time span of at least 1 second to avoid startling the horse.

10. The method of claim 9, further comprising generating the output audio signal to include a music track specially designed to relieve stress in horses.

11. The method of claim 10, wherein the anatomically-shaped earbuds attenuate ambient noise by at least 20 dB when fitted securely in the horse's ears.

12. The method of claim 10, wherein processing the input audio signal further comprises applying a low-pass filter to the input audio signal to attenuate frequencies above 10 kHz before generating the output audio signal.

13. The method of claim 10, wherein receiving the input audio signal comprises wirelessly receiving the input audio signal from a remote audio source using a Bluetooth receiver.

14. The method of claim 10, further comprising:

a. receiving user input from a remote control device wirelessly coupled to the digital audio processor; and b. adjusting the processing of the input audio signal based on the user input.

15. The method of claim 10, further comprising:

a. receiving motion data from an accelerometer coupled to the digital audio processor, the motion data indicative of the horse's head movement; and b. adjusting the processing of the input audio signal based on the motion data to compensate for changes in the earbud position within the horse's ears.

16. The method of claim 10, wherein transmitting the output audio signal to the earbuds comprises transmitting the output audio signal through a sound tube extending from each speaker, the sound tube having a length and diameter acoustically optimized for efficient transmission of sound into the equine ear canal.

* * * * *